United States Patent [19]

Lent et al.

[11] 4,121,789
[45] Oct. 24, 1978

[54] CARGO LATCH

[76] Inventors: Russell J. Lent, 10407 SE. 174th St., Apt. 1301, Renton, Wash. 98055; Ermainio Facchini, 2101 Lincoln Ave., East Meadow, N.Y. 11554

[21] Appl. No.: 825,360

[22] Filed: Aug. 17, 1977

[51] Int. Cl.² .......................... B64D 9/00; B61D 45/00
[52] U.S. Cl. .............................. 244/118 R; 105/366 C
[58] Field of Search ................... 244/118 R, 137 R; 105/366 C, 463, 464, 465; 248/119 R

[56] References Cited

U.S. PATENT DOCUMENTS 3,262,588  7/1966  Davidson ................ 105/366 C X
3,693,920  9/1972  Trautman ................ 105/366 C X
3,927,622  12/1975  Voigt ...................... 244/118 R X Primary Examiner—Barry L. Kelmachter
Attorney, Agent, or Firm—Nolte & Nolte

[57] ABSTRACT

A cargo latch, particularly for securing pallets or containers within an aircraft compartment, of the kind comprising two pivotal latch-arms movable between an operative position in which one arm engages an item of cargo to be secured and the other maintains that one arm in the operative position, nd the collapsed position in which the item of cargo is freed. In such a structure there is provided a catch element for preventing the inadvertent movement of the latch-arms from the operative to the collapsed position.

2 Claims, 4 Drawing Figures

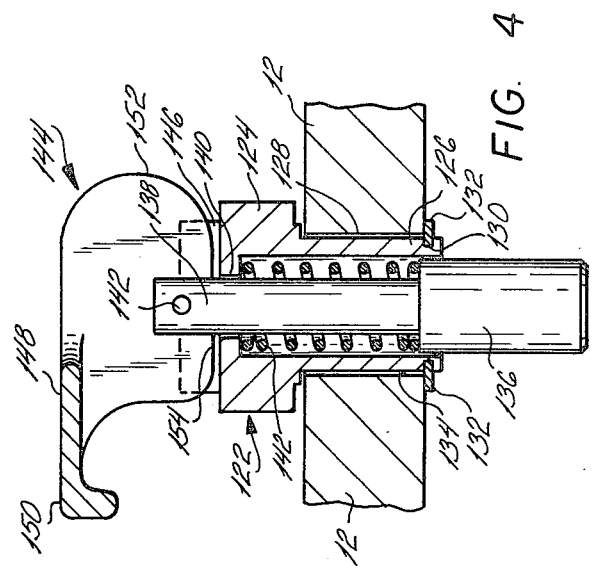
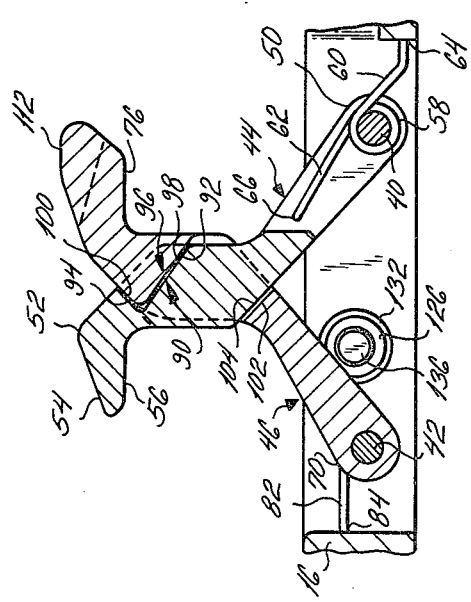
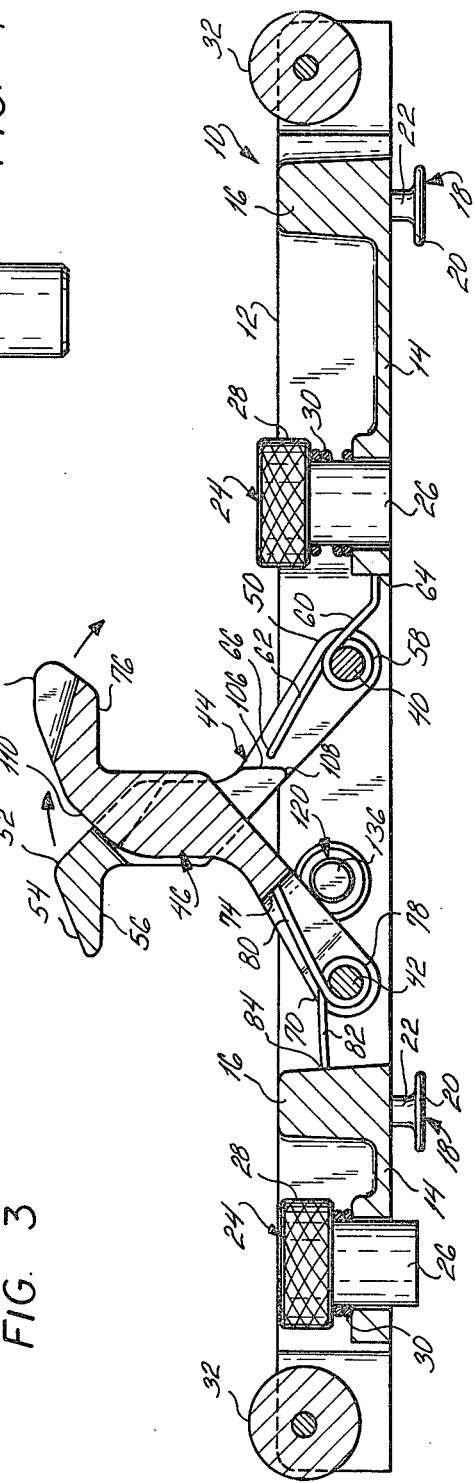

CARGO LATCH

BACKGROUND OF THE INVENTION

This invention is concerned with a cargo latch particularly, but not necessarily exclusively, for containers or pallets to be transported in an aircraft compartment.

A latch exemplary of the kind with which the present invention is concerned is illustrated in U.S. Pat. No. 3,796,397 issued Mar. 12 of 1974 to John Alberti and assigned to the Boeing Company. The device in that patent essentially comprises a frame with means cooperating with a track structure or an aircraft compartment floor and securing means for holding the frame in a selected position along that track. The frame includes a roller means for guiding a pallet or container thereover and, pivotally mounted to the frame rotatable latcharms movable between an erect, operative position in which one of the latch-arms can be engaged with a pallet or container and the other one of which prevents the first mentioned latch-arm from moving from that erect position. The latch-arms are movable to a collapsed position in which they lie within the frame and below the upper surface of the roller means which engage the pallet or container.

These cargo latches are provided at opposite ends of the container, usually there are two or more at each end of each container, and they are effective to prevent movement of the container during acceleration and deceleration of the airplane or other vehicle. It will of course be appreciated that movement of the cargo in flight or on landing or take-off can have disastrous results.

To release the latch-arms for movement to the collapsed position the second mentioned of the two arms is depressed which causes it to be disengaged from the first arm and then, under the action of springs associated with those arms they pivot to the collapsed position. The problem arises in that it is possible for the latch-arms inadvertently to be moved to the collapsed position, either through clumsiness on the part of an operator or by vibration. The present invention seeks to avoid this possibility.

BRIEF SUMMARY OF THE INVENTION

To avoid the inadvertent movement of the latch-arms of a cargo latch from the erect to the collapsed positons according to this invention there is provided a catch element engageable with the latch-arms which will positively prevent such movement.

BRIEF DESCRIPTION OF THE DRAWINGS

An embodiment of this invention is illustrated, schematically, in the accompanying drawings, in which:

FIG. 1 is a part elevational, part sectional view of a cargo latch according to this invention;

FIG. 3 is a section on the line 3—3 of FIG. 2 and,

FIG. 4 is a part sectional, part elevational view of a detail of the latch according to this invention.

DESCRIPTION OF A PREFERRED EMBODIMENT

Figure 2:
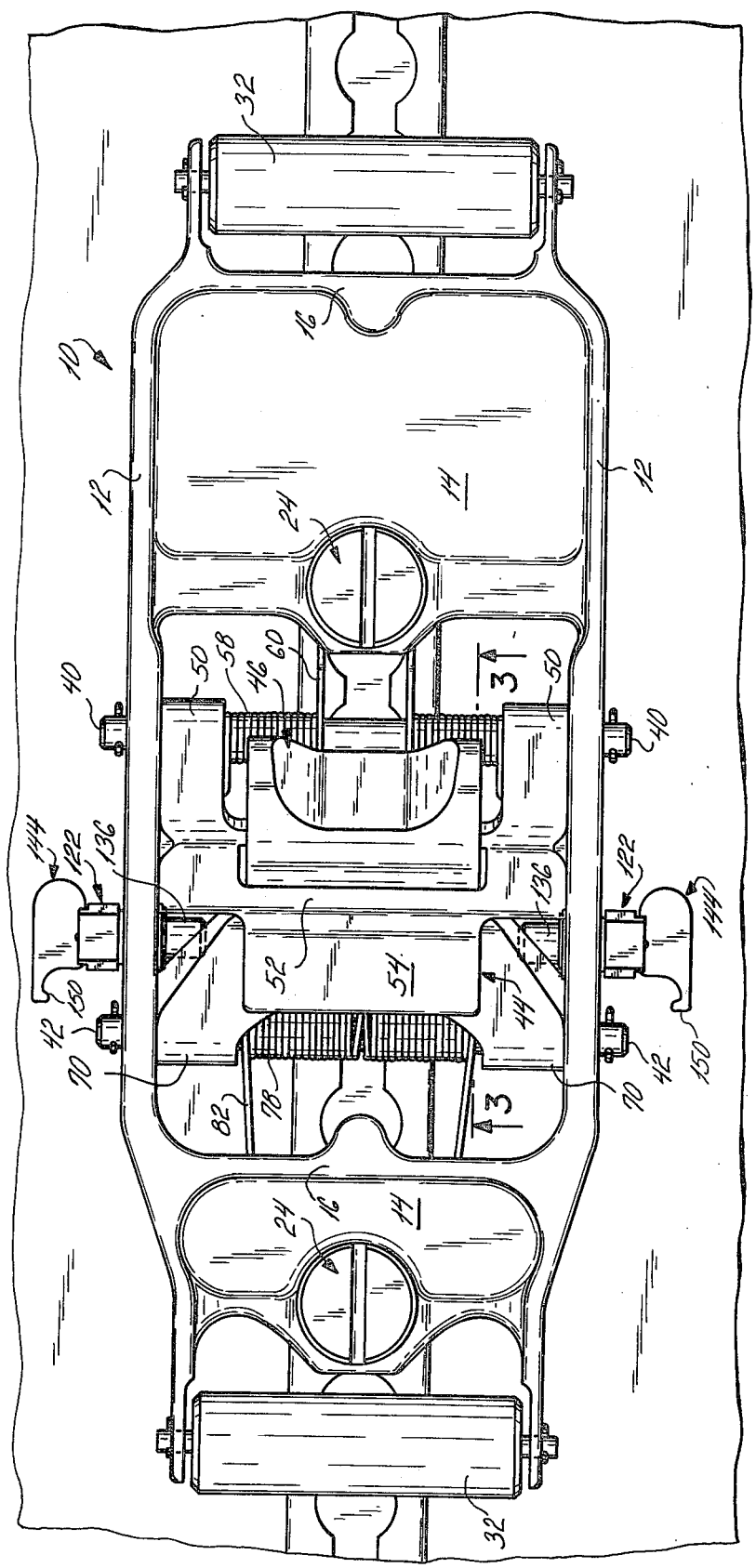
FIG. 2 is a plan view of a part of the latch of FIG. 1.

The cargo latch illustrated in the drawings is one specifically designed for securing a container or pallet within an aircraft compartment. The floor of that compartment is provided with a plurality of fore and aft extending transversly spaced rails of hollow, generally rectangular cross-section. In the upper surface of each rail there is formed a longitudinally extending, central slot that slot comprising alternating wide and narrow portions the purpose of which will become apparent from the following description.

The cargo latch comprises a generally rectangular frame indicated at 10 and having a pair of opposed, longitudinally extending side frame parts 12 which are interconnected by transversly extending webs 14 and ribs 16. Secured to and projecting from the planar undersurfaces of the webs 14 are a pair of centrally disposed T-sectioned studs 18, the heads 20 of which are received within the longitudinally extending channel of the guide rails and the necks are of a diameter slightly lesser than the narrow portions of the slot in the rail so that they will not prevent sliding movement of the latch along the rails. The heads of the studs are of lesser diameter than the widened portions of the slot and the studs are spaced apart by a multiple of the distance between adjacent widened portions so that by bringing the studs into register with widened portions of the slot of the rail the latch may be lifted from the rail and inserted into it as required.

Also secured in web portions 14 of the frame are a pair of locking elements indicated generally at 24. Those elements being spaced apart by a multiple of the distance between adjacent widened portions of the slot of the guide rail and comprise a stud 26 rotatable and axially movable within a correspondingly shaped bore formed in the web 14 and a knurled head 28. The stud 26 is of a diameter greater than the narrow portions of the guide rail and of lesser diameter than the widened portions of the slot of the rail, for a purpose which will become apparent from the following description.

Each locking element 24 is provided with a spiral spring 30 disposed about stud 26, one end of that spring being secured to head 28 and the other end of that spring being secured to an adjacent portion of web 14.

Not visible in the drawings but of known structure there is provided a bayonet type groove in the stud and into which the leading end of a grub screw set into a threaded bore of web 14, projects.

By depressing head 28 against the action of spring 30 the distal portion of stud 26 will be projected below the lowermost surface of the frame and since the spring is secured at one end to the head and at the other end to the web 14 that spring will exert a torque turning the stud guided by the L-shaped bayonet slot when the head of the grub screw reaches an upper, circumferentially extending portion of that bayonet slot, the stud will turn to be secured in the depressed position with the distal end of the stud projecting from the under surface of the frame. Rotation of head 28 to bring the head of the grub screw into alignment with the vertically oriented limb of the L-shaped bayonet slot will cause the locking element to be moved upwardly under the action of spring 30 so that the distal end of the stud is flush with the under surface of web 14. It will be appreciated that projection of the stud into a widened portion of the slot in the upper surface of the guide rail, since that portion of the stud is of greater diameter than the narrow portions of the slot of the rail, will preclude longitudinal movement of the latch along the rail. The spacing between the locking element 24 and element 18 is such that when the stud 26 of element 24 is disposed within a widened portion of the slot of the guide rail, the element 18 is disposed at a narrow portion of that slot so that the head 20 of the stud 18 will be effective to preclude the latch from being lifted from the guide rail.

Rotatably supported at opposite ends of the frame 12 are anti-friction roller elements 32 which serve, as will be described hereinafter, to guide a container or pallet being moved across the latch.

Mounted upon pivot rods 40 and 42 journaled in side elements 12 of the frame are latch-arms 44 and 46 respectively, latch-arm 44 being a cargo engaging arm and arm 46 being effective to maintain the arm 44 in an erect, cargo engaging position and being operable to free arm 44 for movement of both the arms to a collapsed position.

The form of the arms can be discerned from a consideration of FIGS. 1, 2 and 3. Arm 44 comprises an essentially U-shaped casting symetrical about a center line and having its distal end 50 provided with openings by which the arm is mounted upon pivot 40. A cross piece 52 connects the opposite ends of the limbs of the U-shape and is provided with a projecting, nose-like configuration 54 which, in this particular embodiment has a generally flat under surface 56 for engagement with a correspondingly shaped part of a pallet or container or other item of cargo to be latched. Around pivot 40 and between the limbs of the arm 44 are a pair of coil springs 58 each of which is provided with tail portions 60 and 62 of which tail portions are secured, as at 64, to a rigid part of frame 10 and tail 62 is secured, as at 66, to one of the legs of arm 44 at a position space from pivot 40 so that, as viewed in FIGS. 1 and 3 the arm 44 is biased to turn in a clockwise direction about pivot 40 to a collapsed position.

Certain surfaces of the limbs and cross piece of arm 44 especially shaped for cooperation with corresponding surfaces of arm 46 as will be described hereinafter. Arm 46 is of generally Y-shape having the arms of the Y pivoted at distal ends 70 to pivot 42 and the limbs converging to a crotch region 74 and having a tang like portion 76, which in the erect position of arms 44 and 46, projects between the limbs of the U-shaped structure of arm 44. Coiled about pivot 42 are a pair of coil springs indicated at 78 each having tail elements 80 and 82, tail elements 80 being secured at crotch 74 and tail elements 82 being secured as at 84 to a rigid part of frame 10. Thus the arm 46 is biased, as viewed in FIGS. 1 and 3 in a counterclockwise direction.

As can be seen particularly in FIGS. 1 and 3, the limbs of the U-shaped casting constituting arm 44 are recessed at their junctions with the cross piece as at 90 to define surfaces 92 and 94 and the tang 76 of arm 46 has corresponding projecting portions 96 defining surfaces 98 and 100, those projecting portions being received within recesses 90 of arm 44. In the erected position of the arms cooperation of surfaces 92 and 98 and surfaces 94 and 100 prevent the arm 44 from moving in a clockwise direction. Similarly shoulder regions 102 adjacent the crotch of the catch arm 46, cooperating with adjacent surfaces 104 of the limbs of the U-shaped casting constituting latch arm 44 will prevent movement of latch arm 44 in a counterclockwise direction.

To move the latch arms from their erected positions pressure is applied to tang 76 of arm 46 to move that arm in a clockwise direction. Initially surface 98 will slide upon surface 92 until such time as those two surfaces are disengaged. Surface 98 will then move into engagement with surface 106 (see FIG. 1) and as it is disengaged from that surface 106 when arm 44 is almost lying in a plane parallel with the general plan of the frame 10, that arm will continue its movement clockwise, with the edge 108 of surface 106 riding over surface 110 of tang 76 until such time as it comes into engagement with web 14 at which time surface 106 will be in engagement with regions 112 of tang 76 and will hold arm 46 in a flat or collapsed position.

To erect the latch-arms, arm 4 is grasped and turned counterclockwise against the action of spring 58 reversing the motion discussed supra until such time as the position shown in FIGS. 1 and 3 is reached.

To this point the structure is largely conventional and it will be appreciated that with such a structure the absence of safety means subject of this invention any inadvertent application of pressure to tang 76 could cause arm 44 to be disengaged from an item of cargo to be held with possibly disastrous results. Additionally vibration within an aircraft could conceivably cause disengagement of the two arms and the movement of arm 44 to a collapsed, cargo releasing position. To avoid this possibility according to this invention, there is provided a safety catch indicated generally at 120 in FIG. 1 secured in each side element of the main frame. That safety catch device is illustrated more clearly in FIG. 4 where there is shown a catch body element indicated generally at 122 and comprising a head portion 124 from which projects a tubular extension 126 which is received within an opening 128 in side frame element 12. At the end of extension 126 remote from head 124 an annular groove 130 is formed in the outer cylindrical surface of the extension, that groove receiving a split ring securing element 132 which prevents the extraction of body 122 from opening 128. Disposed within a central passage 134 of the body is a catch element 136 having a operating stem part 138 projecting therefrom through the central passage and extending through an opening 140 of reduced diameter in the head. A spring 142 acts to bias the catch element 136 outwardly of passage 134 of body 122.

The end of stem 138 opposite to catch element 136 is provided with an opening 142 through which a pivot pin is passed that pivot pin also extending through opposite side walls of a cam like operating element generally at 144.

The cam like element is disposed within a generally radially (relative to the catch element 136) disposed slot 146 formeing the upper surface of head 124 and comprises a pair of side wall elements connected by a bridge 148 which is extended as at 150 to form a finger grip. The edges 152 of the side wall elements of the operating element 144 are rounded and it will be recognized that the distance between 142 and edge 154 of the side wall element of the operating element 144 is considerably lesser than the distance between the pivot of 142 and the bridge 148 so that as the extension 150 constituting the finger grip is grasped and the cam like element lifted upwardly to roll upon surfaces 152 so too the catch element 136 will be retracted and as that operating element 144 is turned approximately 180° so catch element 136 will be fully retracted into passage 134.

As noted here above there are two such elements as those illustrated in FIG. 4, one in each of the side frame elements 12 of the basic frame 10 and they are disposed in those frame elements in such a manner that with the latch arms in the erected position catch element 136 is immediately behind the limbs of latch arm 46 so that with the catch element in the position shown in FIG. 4 and with that catch element projecting through passage 134 it is impossible for arm 46 to be moved in a clockwise direction and therefore it is impossible for the latch arms to be inadvertently moved into a collapsed position from an erected position when that catch is thrown.

When it is required to lower the latch arms that is to move them from the erected to the collapsed positions operating element 144 is operated to retract the catch element 136 at which time the latch arms may be lowered as described supra. After the latch arms are moved to a collapsed position it is considered procedurally desirable that the operating element 144 of the safety catches be returned to the position shown in FIG. 4 at which time the leading ends of catch element 136 will abut the outer surfaces of the adjacent arms of arm 146 so that when the latch arms are moved to their erected positions, the catch under the influence of the spring will be ready to automatically project catch element 136 behind the limbs of arm 146.

It must be understood that while in the particular embodiment of the invention illustrated, the catch element 136 is illustrated as cooperating with the limbs of arm 46 and while this is desired, it is possible to provide such a catch element to preclude the possibility that the latch arms move to their collapsed position which will cooperate with arm 44.

What is claimed is:

1. A cargo latch of the kind comprising a frame, a first latch arm having means for engaging at item of cargo, said first latch-arm being pivoted to said frame for movement between an erect, operative position and a collapsed, inoperative position, means biasing said first latch-arm towards said collapsed position, a second latch-arm pivoted to said frame and moveable between an erect, operative position in which said second latch arm engages said first latch-arm and holds said first latch-arm in an erect position and a collapsed, inoperative position in which said second latch-arm frees said first latch-arm for movement from said operative to said inoperative position under the influence of said biasing means, wherein a safety catch is provided, said safety catch being mounted on and fixed to said frame and having a catch element movable between a projecting attitude in the path of movement of one of said latch-arms between said operative position and said inoperative position and a retracted attitude in which said catch element is removed from said path of movement, said catch element comprising a bolt member, means biasing said bolt member toward said projecting attitude and a cam-action operating element, said cam-action operating element being movable between a bolt member releasing position in which said bolt member is freed to move to said projecting attitude and a bolt member withdrawn position in which said bolt member is held in said retracted attitude, said bolt member being so positioned in said frame that one of said latch-arms constitutes means, in said collapsed position thereof, preventing movement of said bolt member to said projecting attitude and freeing said bolt member to move to said projecting attitude as said latch-arm moves to said erect position.

2. A cargo latch is claimed in claim 1 wherein said catch element in said projecting attitude is disposed in the path of movement of said second arm from its operative to its inoperative position.

* * * * *